United States Patent Office 3,488,314
Patented Jan. 6, 1970

3,488,314
POLYVINYL CHLORIDE COATING COMPOSITIONS CONTAINING PHENOL-FORMALDEHYDE AND EPOXY RESINS
Robert Lee Fuller, New York, N.Y., assignor to Paisley Products, Inc., a corporation of Delaware
No Drawing. Filed July 23, 1965, Ser. No. 474,458
Int. Cl. C08f 29/22
U.S. Cl. 260—31.8                 15 Claims

ABSTRACT OF THE DISCLOSURE

A self-adhering coating composition capable of adhering to smooth, hard substrates without the application of a primer coat which comprises a dispersion of polyvinyl chloride-type resin, e.g., a vinyl chloride homopolymer, in a plasticizer, e.g., di-decyl phthalate, said dispersion also containing a cross-linking admixture of an epoxy resin, a phenolic resin, e.g., a phenolic novolak resin, and at least one organic co-catalyst compound capable of being a methylene donor, e.g., hexamethylenetetramine, to provide low temperature cure during fusion of said polyvinyl chloride-type resin.

Also disclosed are substrates coated with this coating composition, and methods for preparing such coating compositions, and the coated substrates.

---

This invention relates to self-adhering polyvinyl resin coating dispersion compositions. More particularly, this invention relates to plastisols and organosols of polyvinyl halide-type resins having a heat activated cross-linking system formed from an admixture of selected synthentic resins and an organic cocatalyst compound which upon the application of heat is capable of effecting rapid cross-linking of said synthetic resins for producing an impervious coating having strong adhesion for metal and other smooth, hard substrates, to the resulting coated substrates, and to the methods for preparing such plastisols and organosols and coated substrates.

Heretofore, it has been difficult to employ polyvinyl halide resin dispersions as coatings for metals and the like smooth, hard substrates because of their poor adhesion for such materials. Usually, application of these plastisols and organosols necessitates pretreatment of the surface of the metal or other substrate such as by physically altering the surface by roughing, etching, and the like, coating the surface with a primer coat, or, in some instances, applying a primer coat followed by the application of additional coating compositions or combination of these surface treatments.

In order to overcome the disadvantages of the prior art, this invention contemplates self-adhering coating compositions capable of directly adhering to smooth surfaces of substrates such as steel, aluminum, glass, tin, wood, ceramic tile and the like, without any adhesion-promoting pretreatment thereof, which comprise plastisols and organosols of polyvinyl chloride-type resins having therein a cross-linking admixture of epoxy-type resin, phenolic resin, and at least one cocatalyst compound capable of being a methylene donor, to provide a low temperature cure during fusion of the polyvinyl chloride-type resin. For example, the polyvinyl chloride-type resin plastisols and organosols of this invention contain, based on the total weight of the sol, a blend of from about 2% to about 20% by weight of epoxy-type resin, from about 1% to about 15% by weight of phenolic resin, and from about 0.5% to about 3% by weight of at least one organic cocatalyst compound capable of providing methylene linkages when the plastisols and organosols are heated to the fusion point of the polyvinvl chloride-type resins.

The term "polyvinyl chloride-type resin" as used throughout this application is meant to include vinyl chloride homopolymers and vinyl chloride copolymers wherein the vinyl chloride monomer is copolymerized with a minor proportion of at least one other copolymerizable ethylenically unsaturated compound. Representative of the ethylenically unsaturated compounds that may be copolymerized with vinyl chloride are vinyl esters such as vinyl acetate, vinyl propionate, vinyl butyrate; vinylidene halides such as vinylidene chloride and vinylidene bromide; acrylic and alpha-alkyl substituted acrylic acids, their esters, their amides and their nitriles such as acrylic acid, methylacrylate, acrylamide, methacrylamide, acrylonitrile and the like; the vinyl aromatic compounds such as styrene, and the like. In general, the copolymers contain above 75 percent vinyl chloride, with the remainder of the polymer being the other ethylenically unsaturated compounds. It will be appreciated that because the protective coatings produced by the vinyl chloride copolymers are usually less passive than those produced by the vinyl chloride homopolymers, the latter are preferred for the purposes of this invention. Exemplary of the preferred commercially available polyvinyl chloride resins are those referred to by the trade designations Geon 121, 126, Exon 654, Vinylite VYNV, Vinylite QYNV, Marvinol VR-10, and the like.

The epoxy-type resins suitable for the purposes of this invention include polymeric reaction products of polyfunctional halohydrins with polyhydric phenols. Such resins are known in the art as "epoxy," "epoxides," "vic-epoxides," "glycidyl ethers" or "ether-epoxides." Among the polyfunctional halohydrins that may be employed to produce the epoxy resins are epichlorohydrin, glycerol dichlorohydrin and the like. Typical polyhydric phenols are the resorcinols and the 2,2-bis (hydroxyphenyl) alkanes, i.e., compounds resulting from the condensation of phenols with aldehydes and ketones including formaldehyde, acetaldehyde, propionaldehyde, acetone, and the like. The epoxy resins often contain terminal epoxy groups but also may contain both terminal epoxy groups and terminal hydroxyl groups.

Many commercially available epoxy-type resins may be employed in the practice of the present invention. These resins include the epoxy resins marketed by the Union Carbide Corporation under the trade names "ERL 2774" and "ERL 3794," the Epon resins sold by the Shell Chemical Company, i.e., Epon 1001, Epon 1004, Epon 1007, Epon 1009 and Epon 828, those sold by Ciba Company, Inc. designated as Araldite 6010 and 6020, and the GenEpoxy Resins sold by General Mills Chemical Division, i.e., GenEpoxy 175, 190 and 525.

In addition to the conventional epoxy-type resins, other epoxy intermediates and modified epoxy resins may be employed to produce the self-adhering coating compositions of this invention. "Unox" Epoxide 201, a product of Union Carbide Corporation, is representative of the new epoxy intermediates that are useful. The modified epoxy-type resins often containing reactive diluent such as styrene oxide, octylene oxides, allyl glycidyl ether, butyl-glycidyl ether, phenyl glycidyl ether, and the like reactive compounds in amounts varying up to about 20 to 30 parts of diluent per 100 parts of the epoxy resin. Examples of such modified epoxy resins that are commercially available are Bakelite ERL 2795, ERL 4289, ERL 2774, Araldite 502, GenEpoxy M-180 and Epon 815. It will be appreciated that the term "epoxy-type resin" as herein employed is meant to include the conventional epoxy resins hereinabove described and also those modified epoxy-type resins and intermediate epoxy resins.

The phenolic resins employed in this invention include heat fusible, phenolic novolak resins and the heat curable, one-step phenolic resins. The novolaks usually are prepared by using a molar ration of formaldehyde to phenol of less than about 1 to 1 in the presence of a catalyst that is preferably acidic under appropriate reaction conditions. Novolaks are permanently fusible and soluble and do not themselves pass into a cross-linked state.

In order to make the novolak resin infusible and capable of being cured by heat, it must be further reacted with a methylene donor or a source of methylene bridges or linkages. Usually the methylene bridges are provided by compounds which generate formaldehyde which in turn subsequently provides additional methylene bridges between adjacent phenolic nuclei.

The one-step phenolic resins employed in the invention are prepared with a larger mole ratio of formaldehyde to phenol than is employed to prepare the novolaks. Under the influence of alkaline catalysts, phenol reacts with aqueous formaldehyde to attach hydroxymethyl (methylol) groups to form one to all three of the phenolic ortho and para positions with or without the establishment of methylene linkages between phenolic nuclei. Such resins may be cured to the thermoset (cross-linked) condition by the application of heat alone, but such cure does not proceed rapidly enough for the purposes of the invention; hence, the organic cocatalyst compounds are employed to accelerate the rate of cure.

The organic cocatalyst compounds capable of being methylene donors contemplated by this invention include hexamethylenetetramine, paraformaldehyde, sym-trioxane, anhydroformaldehydeaniline, and the like non-resinous compounds. Preferably the cocatalyst compound is a nitrogen-containing compound such as hexamethylenetetramine which is a product of ammonia and formaldehyde. These cocatalyst compounds are considered methylene donors in that they effect rapid cross-linking of heat fusible novolak resins and the one-step phenolic resins with methylene or equivalent linkages by the application of heat.

It will be appreciated that at least one epoxy resin, at least one phenolic resin, and at least one cocatalyst organic compound capable of being a methylene donor, as well as mixtures of each, may be employed to prepare the plastisols and organosols of this invention.

As used herein, the expression "polyvinyl chloride-type resin plastisols" has reference to those liquid dispersions of finely divided resin particles in a plasticizer which may include small amounts of volatile non-aqueous diluents and/or dispersants and ingredients such as fillers, pigments, dessicants, and the like. When the volatile content of the dispersion exceeds about 3% of the total weight, it is referred to herein as an "organosol." The amount of volatiles may range from about 3% to about 60% of the weight of the organosol, but the relationship of the proportions between the resin and the plasticizer remains unchanged. Usually, the polyvinyl chloride-type resin constitutes from about 25% to about 80% of the total weight of the plastisol or organosol, with from 30% to 50% being the preferred range, and the amount of plasticizer may vary from about 10% to about 50%, and preferably from 20% to 40%, of the total weight of the plastisol or organosol.

The plastisols and organosols employed by the invention of this application may be prepared according to their end use requirements and as such require the incorporation or ingredients conventionally used to prepare such materials. Usually, the incorporation of the cross-linking admixture of the epoxy-type resin, phenolic resin and organic compound capable of being a methylene donor which causes the plastisol or organosol to bond to the substrate are not, for the most part, a determining factor in the choice of the vinyl chloride-type resin, plasticizers or other ingredients commonly employed therein.

The liquid plasticizers used to prepare the plastisols and organosols of this invention include any one, or a mixture of more than one, of the plasticizers that are used in the art for compounding plastisols and which are compatible with the epoxy and phenolic polymers employed herein. The liquid plasticizer solvates the polyvinyl halide at elevated temperatures; it is essentially non-volatile and it remain solvated in the polymeric system upon cooling. When fluidity is to be promoted, plasticizers that are employed in the plastisols for use in the invention are liquid plasticizers that have higher boiling points.

By way of exemplification, suitable plasticizers for use in the plastisols and organosols include the liquid phthalates substituted with alkyl and/or alkoxyalkyl groups in which the alkyl groups contain a total of at least 8 carbon atoms, such as dibutyl phthalate, diamyl phthalate, dimethoxyethyl phthalate, dibutoxyethyl phthalate, dicyclohexyl; the dioctyl phthalates such as di-(n-octyl) phthalates, di(2-ethyl-hexyl) phthalate, diisooctyl phthalates, didecyl phthalate, didodecyl phthalate, butylbenzyl phthalate, and mixtures of dialkyl phthalates which have an average of 8 carbon atoms in the alkyl groups such as exist in mixtures of diheptyl phthalate, dioctyl phthalate and dinonylphthalate; also diphenyl phthalate, mixed ethoxyethyl phthalate, isooctyl isodecyl phthalate, and the like.

It will be appreciated that other plasticizers including the phosphonates and phosphates such as 2-ethylhexyl diphenyl phosphate, tricresyl phosphate, and the like; the polyalkalene glycol condensates, derived from the adipates, azelates and the like alkylene group donors and hydrocarbons and chlorinated hydrocarbons, such as aromatic petroleum oil and liquid chlorinated paraffin may be also employed.

In preparing the organosols that may be employed as the coating composition of this invention, a volatile organic liquid is required to achieve the desired fluidity of the composition. In general the liquid is essentially a non-solvent for the polyvinyl halide resin whereas it may be a solvent for the epoxy and heat fusible phenolic novolak resins.

Typical organic volatile liquids include the volatile liquid aromatics such as benzene, toluene, xylene, ethyl benzene and isopropyl benzene, as well as the aliphatics such as methyl ethyl ketone, methyl isobutyl ketone, diacetone ketone, butyl Carbitol, diethylene glycol monoethyl ether, cyclopentane, cyclohexane, and the like. The aromatic and/or aliphatic hydrocarbons may be used alone or in appropriate mixtures.

It will be appreciated that in preparing the coating compositions in this invention a wide variety of procedures and curing techniques may be employed. The amount of epoxy resin, phenolic resin and methylene donor employed as a cross-linking admixture to effect bonding of the polyvinyl chloride-type resin to the substrate may be varied depending upon the curing conditions employed.

In general, the fusion point of the polyvinyl chloride-type resin is of importance since cross-linking preferably occurs at or below this temperature. Thus, it has been found that heating the coating composition of this invention to temperatures of from about 275° F. to 400° F. for several minutes or until the volatile ingredients have evaporated and the resins are fused provides an adherent, protective coating for metals and the like. Higher temperatures may be employed, but usually they are not required to effect the curing necessary to provide self-adhesion for the coating compositions. In most cases, higher temperatures are avoided in order to prevent degradation of the polyvinyl chloride-type resins.

Advantageously, it has been found that after selection of the proper proportions of ingredients, no special mixing techniques are necessary for preparing the coating dispersions of this invention. Furthermore, no special application techniques need be employed for applying these materials to a substrate to be coated, and such conventional methods such as dipping, spraying, coating, knife coating or dispensing are completely satisfactory.

Although cross-linking of the epoxy-type and the phenolic resins with a methylene donor such as hexamethylenetetramine may take many routes, it is believed that heating hexamethylenetetramine causes it to break down to form formaldehyde and ammonia, and that these products in turn cause cross-linking of the phenolic and the epoxy-type resins. Apparently, the formaldehyde reacts with the phenolic novolak resin to form methylol groups on its phenolic nuclei. These methylol groups subsequently produce methylene bridges upon further heating of the plastisol and organosol compositions to the fusion state of the polyvinyl chloride-type resin. In this manner the novolak resin is converted from a fusible thermoplastic resin to a nonfusible thermosetting resin and the cure of the one-step phenolic resin is accelerated. In both cases the resulting products contain reactive polar hydroxyl groups that facilitate the bonding of the polyvinyl chloride-type resin dispersions to the metal or other hard, smooth substrates.

In addition, it is believed that the ammonia evolved from the hexamethylenetetramine is decomposed by heat by the following reaction:

$$2NH_3 \rightarrow 3H_2 + N_2$$

The nitrogen and hydrogen thus evolved will both react with the epoxy resin to effect its cross-linking in the coating composition; the nitrogen serving as a catalyst and the hydrogen as a reactive hardener. Two types of reactive groups in the epoxy-type resin will take part in this cross-linking reaction; that is, the epoxide

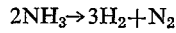

and the hydroxyl (—OH). Many epoxy resins have epoxide groups at both ends, and all but the shortest of their intermediates have hydroxyl groups spaced at regular intervals along the chains of the epoxy resins. It is believed that the nitrogen converts the hydroxyl group to an alkoxide-like ion which subsequently reacts with an epoxy group to form another alkoxide-like ion. This ion then combines with a second molecule of the epoxy resin forming an ether and regenerating an alkoxide-like ion to combine with still a third epoxide molecule, the chain reactions thus proceed. In this manner each nitrogen molecule can account for the polymerization and cross-linking of six to eight epoxide molecules.

As to the hydrogen, it is believed that it acts directly upon the three membered ring of the epoxide group. Such rings are highly reactive and will open upon slight provocation. Apparently hydrogen opens the ring and thus forms a secondary amine which in turn reacts with another epoxide group.

It is also believed that the other organic compounds enumerated above as possible methylene donors also produce formaldehyde upon heating which in turn will react with the phenolic in the above-described manner. The resulting products are apparently further cross-linked with the epoxy-type resin through their reactive hydroxyl groups.

Surprisingly, it has been found that despite the formation of gases during the cross-linking reactions, the resultant coatings are nevertheless quite smooth and free of the fissures and pinholes which would be expected to arise from the presence of such gases within the cross-linking system.

The protective, self-adhering coating produced from plastisols or organosols by this invention comprises a fused resin strongly bonded to a substrate by the cross-linked system formed from the reaction of polyvinyl chloride type resin, epoxy resin, phenolic type resin, and at least one organic cocatalyst compound capable of providing methylene linkages, i.e. (—$CH_2$—) at temperatures of from about 275° F. to 400° F.

This coating has been found to adhere directly to metal and other smooth, hard surfaces and to maintain its adhesion even when exposed to oils, gasoline, water, dry cleaning solvents, industrial solvents, and the like, as well as numerous other service conditions and environments.

Furthermore, in accordance with this invention, the polyvinyl chloride-type resin coating compositions provide a protective coating on the coated substrate which is not only smooth in appearance, but also which has increased abrasion resistance, increased strength at elevated temperatures and improved compression set. The expression "improved compression set" has reference to the ability of the coating to recover after it has been deformed under normal compression conditions.

Advantageously, the coating compositions of this invention can be colored to simulate leather, wood, metal, and the like surfaces. Representative of the pigments, dyes, and the like that may be blended within the compositions are carbon black, titanium dioxide, chrome yellow, chrome green, molybdenum orange, phthalocyanine blue, phthalocyanine green, and the like. Generally the amounts of these materials may vary over a wide range and are determined primarily by the final hue or degree of opacity desired in the coating.

In addition, fillers, light and heat stabilizers, and the like compounding ingredients may also be added to the coating compositions. Among the light and heat stabilizers are the calcium, cadmium or lead soaps, oxides of barium or lead, lead silicate, hydrous tribasic lead sulfate, and the like; the fillers include calcium carbonate, calcium oxide, silica and the like materials. The presence of fillers is based primarily on the desired end use of the cured coating and they vary from about 0% to 25% by weight of the composition. The light and heat stabilizers, however, are usually necessary and will constitute from about 0.1% to 5% of the total composition.

It will be appreciated that certain ingredients such as calcium oxide may operate as catalysts to promote the cross-linking reactions that occur during the curing of the composition with the organic compounds capable of being methylene donors.

In order that the present invention may be better understood, the following examples are given as being illustrative, but not as being limitative thereof.

EXAMPLE I

A typical plastisol coating composition of this invention has the following recipe:

| | Percent by weight |
|---|---|
| Polyvinyl chloride[1] | 40.00 |
| Di(2-ethyl hexyl) phthalate | 25.00 |
| Di-decyl phthalate | 15.00 |
| Hydrous tribasic lead sulfate | 1.50 |
| Calcium carbonate | 11.00 |
| Calcium oxide | 1.00 |
| Carbon black | 0.50 |
| Epoxy resin[2] | 3.00 |
| Phenolic novolak[3] | 2.00 |
| Hexamethylenetetramine | 1.00 |
| | 100.00 |

[1] PVC-71 made by Diamond Alkali Company.
[2] Unox Epoxide 296 made by Union Carbide Chemicals Company.
[3] BRP-5095 made by Union Carbide Plastics Company.

The plastisol is prepared by blending the ingredients in a paddle mixer and then vaccum deairing, thus forming an intimately mixed uniform dispersion.

EXAMPLE II

Using the plastisol prepared in Example I, a battery rack is preheated and then dipped into the plastisol to pick up a coating of 30 mils thickness. Then the coated rack is placed in an oven at 350° for 20 minutes in order to fuse the vinyl chloride resin and, at the same time, adhere the plastisol to the rack.

After the rack has cooled to room temperature, the adhesion of the plastisol is evaluated by the following test procedure:

Two parallel razor blade cuts are made a half-inch apart and several inches long. Then an inch length of the plastisol film is scraped free from the metal with a half-inch carpenter's chisel, making a one-inch tab. The tab is gripped with a pliers and pulled over through 135° and then a pulling force at a 45° angle toward the remaining length of the cut strip is applied. When the pulling force becomes considerable, the plastisol film tab breaks, but there is no evidence of an adhesive failure. The adhesion is equal to or greater than that obtained by a conventional primer-plastisol top coat system.

The results of this test point out the outstanding adhesion achieved by the composition, particularly in that the tab itself breaks, which is a cohesive failure, but the adhesive bond between the metal and coating does not part.

EXAMPLE III

Using the plastisol composition described in Example I, an organosol is prepared containing 92% by weight of the plastisol and 8% by weight of odorless kerosene. This organosol is sprayed to a fused thickness of 8 mils on a cold-rolled steel panel. After curing at 360° F. for 15 minutes, the adhesion test described in Example II is repeated several times; each time with the same results—the film cannot be stripped from the panel.

EXAMPLE IV

Following the procedure described in Example II, an electric fuel pump is coated with a plastisol having the following recipe:

| | |
|---|---|
| Polyvinyl chloride [1] | 40.00 |
| Di-decyl phthalate | 36.00 |
| Calcium carbonate | 10.00 |
| Titanium dioxide | 3.00 |
| Chrome green | 1.30 |
| Calcium oxide | 1.00 |
| Heat stabilizer [4] | 1.00 |
| Epoxy resin [2] | 4.00 |
| Phenolic "one-step" resin [3] | 2.50 |
| Hexamethylenetetramine | 1.20 |
| | 100.00 |

[1] Exon 605 made by Firestone Plastics Company.
[2] Epon 826 made by Shell Chemical Company.
[3] BPR-4400 made by Union Carbide Corporation.
[4] E.g., hydrous tribasic lead sulfate.

Inspection of the coating shows that it exhibits outstanding adhesion for the steel housing.

It will be apparent that these tests clearly show that this invention provides polyvinyl halide plastisols or organosols that form coatings which adhere to smooth, hard substrates without the need of a primary coat or primer or other pretreatment of its surface.

What is claimed is:

1. A self-adhering coating composition comprising a dispersion of a polyvinyl chloride-type resin selected from the group consisting of vinyl chloride homopolymers and vinyl chloride copolymers containing above 75% by weight of vinyl chloride with the remainder of the polymer being at least one other copolymerizable ethylenically unsaturated compound, in a plasticizer for said resin, said dispersion containing from about 25% to about 80% by weight of said resin, from about 10% to about 50% by weight of said plasticizer and a cross-linking admixture of from about 2% to about 20% by weight of epoxy resin, from about 1% to about 15% by weight of phenol-formaldehyde curable resin and from about 0.5% to about 3% by weight of at least one organic co-catalyst compound selected from the group consisting of hexamethylenetetramine, paraformaldehyde, sym-trioxane, and anhydroformaldehyde aniline, said percentages being based on the total weight of said composition.

2. The composition of claim 1 in which the organic co-catalyst compound is hexamethylenetetramine.

3. The composition of claim 1 in which the phenol-formaldehyde curable resin is selected from the group consisting of heat fusible phenolic novolak resins and heat curable one-step phenolic resins.

4. The composition of claim 1 in which the plasticizer is a liquid compound compatible with the epoxy resin and the phenol-formaldehyde resin.

5. The composition of claim 4 in which the plasticizer is a liquid phthalate having substituents selected from the group consisting of alkyl and alkoxyalkyl groups in which the alkyl groups contain a total of at least eight carbon atoms.

6. A self-adhering plastisol of polyvinyl chloride resin for producing protective coatings that strongly adhere to smooth, hard substances when heated to a temperature of from about 275° F. to about 400° F., which comprises the following weight percentages of ingredients:

| | Percent |
|---|---|
| Polyvinyl chloride resin | 25–80 |
| Plasticizer for said resin | 10–50 |
| Light and heat stabilizers | 0.1–5 |
| Fillers | 0–25 |
| Epoxy resin | 2–20 |
| Hexamethylenetetramine | 0.5–3 |
| Phenol-formaldehyde curable resin | 1–15 | said percentages being based on the total weight of the plastisol, and said plasticizer being a liquid compound compatible with said epoxy resin and phenol-formaldehyde resin.

7. A self-adhering organisol of polyvinyl chloride resin for protective coatings that strongly adhere to smooth, hard substances when heated to a temperature of from about 275° F. to about 400° F. which comprises the plastisol of claim 6 containing at least 3% by weight of a volatile organic diluent which is essentially a non-solvent for the polyvinyl chloride resin.

8. The plastisol of claim 6 in which the phenol-formaldehyde resin is selected from the group consisting of heat fusible phenolic novolak resins and heat curable one-step phenolic resins.

9. A coated substrate having a protective self-adhering coating fused thereon, said coating comprising a mass of fused resin particles strongly bonded to the surface of said substrate by a cross-linked admixture containing from about 25% to about 80% by weight of a polyvinyl chloride-type resin selected from the group consisting of vinyl chloride homopolymers and vinyl chloride copolymers containing above 75% by weight of vinyl chloride with the remainder of the polymer being at least one other copolymerizable ethylenically unsaturated compound, from about 10% to about 50% by weight of a plasticizer for said resin, from about 2% to about 20% by weight of epoxy resin, from about 1% to about 15% by weight of phenol-formaldehyde curable resin, and from about 0.5% to about 3% by weight of at least one organic co-catalyst compound selected from the group consisting of hexamethylenetetramine, paraformaldehyde, sym-trioxane, and anhydroformaldehyde aniline which provides methylene linkages when said coating is heated to fuse said resin, said percentages being based on total weight of said coating.

10. The coated substrate of claim 9 in which the organic co-catalyst compound is hexamethylenetetramine.

11. The coated substrate of claim 9 in which the coating is heated to a temperature of from about 275° F. to about 400° F. to effect fusing and cross-linking of said coating.

12. A coated metal substrate having a self-adhering coating containing a polyvinyl chloride resin bonded thereto, said coating comprising the produced formed by heating a plastisol to a temperature of from about 275° F. to about 400° F., said plastisol containing the following weight percentages of ingredients:

|  | Percent |
|---|---|
| Polyvinyl chloride resin | 25–80 |
| Plasticizer for said resin | 10–50 |
| Light and heat stabilizers | 0.1–5 |
| Fillers | 0–25 |
| Epoxy resin | 2–20 |
| Hexamethylenetetramine | 0.5–3 |
| Phenol-formaldehyde curable resin | 1–15 | said percentages being based on the total weight of said plastisol, and said plasticizer being a liquid compound compatible with the epoxy and phenol-formaldehyde resins.

13. A method of coating substrates with a polyvinyl chloride-type resin selected from the group consisting of vinyl chloride homopolymers and vinyl chloride copolymers containing above 75% by weight of vinyl chloride with the remainder of the polymer comprising at least one other copolymerizable ethylenically unsaturated compound, which comprises applying to said substrate a coating of a dispersion of the polyvinyl chloride-type resin particles in a plasticizer for the resin, said dispersion containing from about 25% to about 80% by weight of the polyvinyl chloride-type resin, from about 10% to about 50% by weight of the plasticizer, and a cross-linking admixture containing from about 2% to about 20% by weight of epoxy resin, from about 1% to about 15% by weight of a curable phenol-formaldehyde resin, and from about 0.5% to about 3% by weight of at least one organic co-catalyst compound selected from the group consisting of hexamethylene-tetramine, paraformaldehyde, sym-trioxane, and anhydroformaldehyde aniline, said weight percentages being based on the total weight of the dispersion, and heating the applied coating to an elevated temperature of from about 275° F. to about 400° F. until the vinyl resin particles fuse into a mass that is strongly bonded to said substrate by the reaction of the resins and the co-catalyst compound within said cross-linking admixture.

14. The method of claim 10 in which the organic co-catalyst compound is hexamethylenetetramine.

15. A method for producing a self-adhering coating plastisol composition that strongly bonds to smooth, hard substrates by the application of heat without any adhesion-promoting pretreatment thereof, which comprises admixing, based on the total weight of the composition, a heat-activatable cross-linking system with from about 25% to about 80% by weight of a polyvinyl chloride-type resin selected from the group consisting of vinyl chloride homopolymers and vinyl chloride copolymers containing above 75% by weight of vinyl chloride with the remainder of the polymer comprising at least one other copolymerizable ethylenically unsaturated compound and from about 10% to about 50% by weight of a plasticizer for said resin, said cross-linking system comprising a mixture of from about 2% to about 20% by weight of epoxy resin, from about 1% to about 15% by weight of phenol-formaldehyde curable resin, and from about 0.5% to about 3% by weight of at least one organic co-catalyst compound selected from the group consisting of hexamethylenetetramine, paraformaldehyde, symtrioxane, and anhydroformaldehyde aniline, and thereafter intimately mixing said polyvinyl chloride-type resin, plasticizer, and cross-linking system together to form a plastisol.

References Cited

UNITED STATES PATENTS

| 2,965,586 | 12/1960 | Fisch et al. | 117—132 |
| 3,047,415 | 7/1962 | Rhodes et al. | 117—21 |
| 3,010,846 | 11/1961 | Bach | 117—75 |
| 3,194,675 | 7/1965 | Carter et al. | 117—26 |
| 3,244,653 | 4/1966 | Wright et al. | 260—23 |

MORRIS LIEBMAN, Primary Examiner

L. T. JACOBS, Assistant Examiner

U.S. Cl. X.R.

117—132, 161; 260—33.6, 831